United States Patent
Scheller et al.

(10) Patent No.: US 11,773,825 B2
(45) Date of Patent: Oct. 3, 2023

(54) ASSEMBLY METHOD AND ASSEMBLY SYSTEM FOR A VIBRATION DAMPER OF A WIND POWER PLANT TOWER

(71) Applicant: SENVION GmbH, Hamburg (DE)

(72) Inventors: Jörn Scheller, Rendsburg (DE); Niklas Neumann, Hamburg (DE); Olaf Samuelsen, Hünning (DE)

(73) Assignee: Siemens Gamesa Renewable Energy Service GmbH, Hamburg (DE)

( * ) Notice: Subject to any disclaimer, the term of this patent is extended or adjusted under 35 U.S.C. 154(b) by 240 days.

(21) Appl. No.: 17/262,564

(22) PCT Filed: Jul. 24, 2019

(86) PCT No.: PCT/EP2019/069982
§ 371 (c)(1),
(2) Date: Jan. 22, 2021

(87) PCT Pub. No.: WO2020/020980
PCT Pub. Date: Jan. 30, 2020

(65) Prior Publication Data
US 2021/0301789 A1    Sep. 30, 2021

(30) Foreign Application Priority Data
Jul. 25, 2018 (DE) .......................... 102018005852.3

(51) Int. Cl.
*F03D 13/10* (2016.01)
*F03D 13/20* (2016.01)
(Continued)

(52) U.S. Cl.
CPC ............. *F03D 13/10* (2016.05); *F03D 13/20* (2016.05); *F03D 13/40* (2016.05);
(Continued)

(58) Field of Classification Search
CPC .............. E04H 9/0215; F05B 2260/02; F05B 2260/964; F05B 2230/61; F05B 2240/912;
(Continued)

(56) References Cited

U.S. PATENT DOCUMENTS

| 2016/0215754 A1 | 7/2016 | Seidel |
| 2020/0271183 A1* | 8/2020 | Jiang ........................ F16F 15/08 |
| 2021/0246880 A1* | 8/2021 | Johansen .............. F03D 7/0296 |

FOREIGN PATENT DOCUMENTS

| DE | 102011109070 A1 | 1/2013 |
| DE | 102015000788 A1 | 7/2016 |

(Continued)

OTHER PUBLICATIONS

German Research Report for application No. 10 2018 005 852.3, dated Apr. 26, 2019, 2 pgs.
(Continued)

*Primary Examiner* — Moshe Wilensky
(74) *Attorney, Agent, or Firm* — Alix, Yale & Ristas, LLP (57) ABSTRACT

The invention relates to an assembly method for a vibration damper of a tower of a wind power plant, in which the vibration damper is switched into a transport state from a state of use. The vibration damper is connected to a structural component of the tower such that a damper mass of the vibration damper can be set in motion, during which movement the distance between the damper mass and a central axis of the tower varies. The vibration damper is switched into the transport state by tilting the vibration damper compared to the state of use. The invention also relates to an associated assembly system.

18 Claims, 7 Drawing Sheets

(51) Int. Cl.
     *F03D 13/40*         (2016.01)
     *F16F 15/131*      (2006.01)

(52) U.S. Cl.
     CPC .... *F16F 15/13142* (2013.01); *F05B 2230/61* (2013.01); *F05B 2240/912* (2013.01); *F05B 2260/02* (2013.01); *F05B 2260/964* (2013.01)

(58) Field of Classification Search
     CPC ... F16F 15/13142; F16F 7/1005; F03D 13/10; F03D 13/20; F03D 13/40
     See application file for complete search history.

(56) References Cited

FOREIGN PATENT DOCUMENTS

| | | |
|---|---|---|
| DE | 202016005517 U1 | 11/2016 |
| EP | 3048299 A1 | 7/2016 |
| WO | 2008071428 A1 | 6/2008 |
| WO | 2008145122 A1 | 12/2008 |
| WO | 2013017244 A2 | 2/2013 |
| WO | 2014040598 A1 | 3/2014 |
| WO | 2018059638 A1 | 4/2018 |

OTHER PUBLICATIONS

PCT International Preliminary Report on Patentability for International application No. PCT/EP2019/069982 filed Jul. 24, 2019, dated Feb. 4, 2021; 16 pgs.

PCT International Research Report and Written Opinion for International file No. PCT/EP2019/069982 filed Jul. 24, 2019, dated Oct. 30, 2019, 6 pgs.

\* cited by examiner

ASSEMBLY METHOD AND ASSEMBLY SYSTEM FOR A VIBRATION DAMPER OF A WIND POWER PLANT TOWER

BACKGROUND

The invention relates to an assembly method and an assembly system for a vibration damper of a tower of a wind turbine.

The normal procedure when erecting a wind turbine is to erect a tower of the wind turbine in a first step and, in a second step, to connect a nacelle to an upper end of the tower. The nacelle has a considerable weight such that the vibration behavior of the tower with no nacelle differs from the vibration behavior of the tower with a nacelle. The tower is constructed for operation with a nacelle. As long as the nacelle is not attached to the tower, there is a risk of undesired vibration being induced in the tower by the wind.

In order to prevent the tower from being damaged in the intermediate stage in which the nacelle has not yet been mounted, a vibration damper can be used which counteracts the vibration of the tower. Different alternative embodiments of vibration dampers have been described in the prior art, WO 2008/145122 A1, DE 20 2016 005 517 U1, WO 2008/071428 A1, WO 2013/017244 A2.

When the nacelle is connected to the tower, there is no longer any free access to the interior of the tower from above. It has proven to be not very simple to remove from the interior of the tower the vibration damper which is no longer required after the nacelle has been attached.

SUMMARY OF THE INVENTION

The object of the invention is to provide an assembly method and an assembly system by means of which the vibration damper can be removed from the tower more simply. Starting from the prior art mentioned, the object is achieved by the features of the independent claims. Advantageous embodiments are given in the subclaims.

In the assembly method according to the invention, the vibration damper is moved from an in-use state to a transport state. In the in-use state, the vibration damper is connected to a structural component of the tower such that a damper mass of the vibration damper can be set in motion, whereby the distance between the damper mass and a center axis of the tower changes. The vibration damper is moved into a transport state by the vibration damper being tilted relative to the in-use state.

The invention has recognized that a vibration damper in which a damper mass is moved such that the distance between the damper mass and a center axis of the tower changes generally has a significant horizontal extent. The openings provided in the tower for transporting a load upward or downward are usually smaller than the horizontal extent of the vibration damper. A transport state for the vibration damper is proposed in which the vibration damper is tilted relative to the in-use state. Such tilting between the in-use state and the transport state does not correspond to the usual procedure when moving loads. A load which is transported, for example, from the ground to the upper end of a wind turbine is normally oriented before being raised such that it can be mounted on the upper end of the wind turbine with no further tilting maneuvers. Tilting maneuvers at great heights are generally undesirable.

The vibration damper can comprise a frame which is connected to the structural component of the tower in the in-use state. The damper mass can be mounted relative to the frame such that the damper mass moves relative to the frame when the vibration damper is operating. The vibration damper can comprise an axis of rotation such that the damper mass performs a rotating movement relative to the axis of rotation when the vibration damper is operating. The vibration damper can comprise a drive (for example, electromotor, electromotor and transmission) by means of which the movement of the damper mass relative to the frame is driven.

The damper mass can move along a circular path at the center of which the axis of rotation is arranged. A guide arm which guides the circular movement of the damper mass can extend between the axis of rotation and the damper mass. The axis of rotation can extend parallel to the center axis of the tower in the in-use state of the vibration damper. The distance between the damper mass and the axis of rotation can be, for example, between 0.5 m and 1 m. The distance between the damper mass and the axis of rotation can be adjusted, for example, by the guide arm being provided with a telescopic mechanism. The damper mass can, for example, have a mass between 50 kg and 100 kg. The mass of the damper mass can be adjusted, for example, by different weights being provided which are optionally used, or by the damper mass having detachable part weights.

In one embodiment, the vibration damper comprises a first damper mass and a second damper mass, wherein the vibration damper is designed so as to move each of the damper masses in the manner described relative to the frame. The axis of rotation of the first damper mass can be parallel to the axis of rotation of the second damper mass. In particular, the axis of rotation of the first damper mass can be coaxial with the axis of rotation of the second damper mass. The first damper mass and the second damper mass can be driven in opposite directions of rotation. Configurations in which the vibration damper comprises three or more damper masses are also possible. In such a case, all the vibration dampers can be driven independently of one another. It is also possible that damper masses are coupled to each other, for example mechanically or electrically.

The vibration damper can comprise a control system such that the movement of the damper masses is controlled depending on the vibration state of the tower. Information on the vibration state of the tower can be processed in the control system in order to drive the damper mass such that it counteracts the vibration of the tower. The vibration damper can comprise a sensor by means of which information on the vibration state of the tower is obtained. It is also possible that the vibration state of the tower is a piece of input information which is supplied to the vibration damper. The vibration damper can be provided with a protective cover in order to prevent inadvertent contact with the damper masses.

In the in-use state, the vibration damper can be arranged in the interior of the tower. A rigid (and detachable) connection between the frame of the vibration damper and the structural component of the tower can be provided, by means of which the vibration damper is held in position. The axis of rotation of the damper mass can coincide with the center axis of the tower. In order to leave sufficient space for other assembly work, the vibration damper can alternatively be arranged excentrically inside the tower in the in-use state. In particular, the vibration damper can be arranged in the in-use state such that a circle described by the damper mass does not intersect the center axis of the tower. In one embodiment, the vibration damper is connected to the wall of the tower in the in-use state. The structural component of the tower can be provided, for example, with studs to which the vibration damper can be screwed. In one embodiment, the structural component is the topmost tower segment of a tower which is composed of multiple tower segments arranged one above the other.

The tilting maneuver by means of which the vibration damper is moved from the in-use state to the transport state is performed before the vibration damper is removed from the tower, in particular before the vibration damper is lifted up or lowered down inside the tower. The angle of tilt over which the tilting movement of the vibration damper extends between the in-use state and the transport state can be greater than 45°, preferably greater than 85°. The angle of tilt is normally not greater than 100°. The tilt axis, about which the tilting movement takes place, can be an axis which encloses with the axis of rotation of the damper mass an angle of at least 45°, preferably at least 70°, and more preferably at least 85°. The tilt axis can in particular be a horizontal axis.

In order to make it easier to perform the tilting movement, the frame of the vibration damper can comprise a housing part and a frame part which can pivot relative to the housing part. The frame part can be connected to the structural component of the tower in the in-use state in order to hold the vibration damper in position. The housing part can be pivoted relative to the frame part while the frame part is still connected to the tower in order to move the vibration damper from the in-use state to the transport state. The housing part can be supported from below such that the weight of the vibration damper can be largely transmitted via the housing part. The frame part can then be detached from the tower and likewise pivoted downward. The mass which is required to be moved is thus considerably reduced.

A reverse process is also possible in which the housing part initially remains connected to the structural component of the tower and the pivotable frame part is tilted downward. In a subsequent step, the housing part can be detached from the tower and likewise tilted downward.

The vibration damper can be configured such that it stands stably on a flat surface in the transport state. The frame of the vibration damper can be provided with rollers such that the vibration damper can be moved on the flat surface by exerting a small amount of force. The rollers can be arranged on the housing part and/or on the frame part of the frame. A housing part refers to that part of the frame in which the damper mass is mounted. The frame part can be configured such that it surrounds the housing part.

A vibration damper with a housing part and a frame part which can pivot relative to the housing part contains an independent inventive step. The vibration damper can be developed with further features which are described in connection with the assembly method according to the invention of the assembly system according to the invention. Such a vibration damper can be retrofitted to existing wind turbines in order to contribute to reducing their fatigue loads and hence to extending their life.

In order to remove the vibration damper, moved into the transport state, from the tower, an upward or downward movement is first required. The vibration damper can be lifted up into the interior of the nacelle. An onboard crane can be used for this purpose. In a subsequent step, the vibration damper can be lowered down outside the tower. The onboard crane can be used for this too. In order to move the vibration damper from the tower into the nacelle, as a rule it needs to pass through an opening in the form of a hatch or a cutout in the floor of the nacelle. In the transport state, the vibration damper should have a horizontal dimension such that it passes through the opening.

In order to lower the vibration damper down, a service elevator arranged in the tower can be used. In the transport state, the vibration damper should have a horizontal dimension such that it fits inside the elevator car of the elevator system. The vibration damper should have a vertical dimension such that it fits through an access opening of the elevator car.

The area formed by the projection of the vibration damper in a horizontal plane is referred to as the horizontal size by area. The horizontal size by area of the vibration damper in the transport state can be at least 10%, preferably at least 20%, and more preferably at least 40%, smaller than in the in-use state. In the in-use state, a large horizontal size by area is advantageous because the action of the vibration damper is generally greater, the greater the range of horizontal movement of the damper mass.

It is advantageous for simple transporting of the vibration damper in the transport state if the vibration damper in the transport state can be contained within a cuboid with dimensions which meet the following conditions individually or in combination. The height of the cuboid is less than 240 cm, preferably less than 190 cm. The width of the cuboid is less than 70 cm, preferably less than 50 cm. The depth of the cuboid is less than 120 cm, preferably less than 90 cm. The damper masses and/or the guide arms can be connected detachably to the frame of the vibration damper. In one embodiment, the damper masses and/or the guide arms are detached from the frame of the vibration damper and are extracted from the tower in a separate procedure.

The tower of the wind turbine can be composed of a plurality of tower segments arranged one above the other. The vibration damper can be connected in the in-use state to one of the tower segments, in particular to the topmost tower segment. The vibration damper can be assembled in the tower segment before the tower segment is placed on the tower.

The tower segment can be arranged in a lying position during the assembly of the vibration damper. A lying position means that the center axis of the tower segment is oriented essentially horizontally. The angular position of the tower segment can be selected such that the wall section in which the vibration damper is assembled is arranged at the bottom. An assembly element for assembling the vibration damper can be arranged in the tower segment. The assembly element can project from the wall of the tower segment such that the frame of the vibration damper is spaced apart from the wall of the tower segment in the in-use state. This can contribute to increasing the range of movement of the damper mass.

A retaining point for a cable/chain hoist can be provided in a wall section, opposite the assembly element, of the tower segment. The vibration damper can be lifted by means of a cable/chain hoist suspended from the retaining point in order to move it into the correct position relative to the assembly element.

A carriage, a system of rollers and/or a system of rails can, for example, be provided for transporting the vibration damper into the interior of the tower segment. A platform which is oriented horizontally in the fully erected state of the tower can be formed in the tower segment. The platform can form an exit platform of the service elevator such that a person traveling up in the service elevator steps onto the platform when they exit. A ladder can lead from the platform (optionally via one or more further platforms) into the interior of the nacelle. The vibration damper can be supported on the platform during the subsequent disassembly.

After the vibration damper has been assembled in the tower segment, the tower segment can be tilted into an upright position. The tower segment can be lifted by a large crane and placed on the tower segment situated below it. The vibration damper can be connected to a power supply and put into operation. The vibration damper can be designed such that it automatically becomes active when the tower starts to vibrate. The vibration damper can be automatically deactivated again when the vibration of the tower has stopped again.

The invention moreover relates to an assembly system comprising a tower of a wind turbine and a vibration damper. The vibration damper is connected to a structural component of the tower in an in-use state such that a damper mass of the vibration damper can be set in motion in order to damp vibration of the tower. In a transport state, the vibration damper is supported on a platform of the wind turbine in a position in which it is tilted relative to the in-use state. A platform in this sense refers to a structural component of the tower on which the vibration damper can be supported from below. The platform can be an exit platform which is arranged at the upper end of a service elevator.

The assembly system can be developed with further features which are described in connection with the assembly method according to the invention. The assembly method can be developed with further features which are described in connection with the assembly system according to the invention.

BRIEF DESCRIPTION OF THE DRAWINGS

The invention is described by way of example below with the aid of advantageous embodiments with reference to the attached drawings, in which.

DETAILED DESCRIPTION

Figure 1:
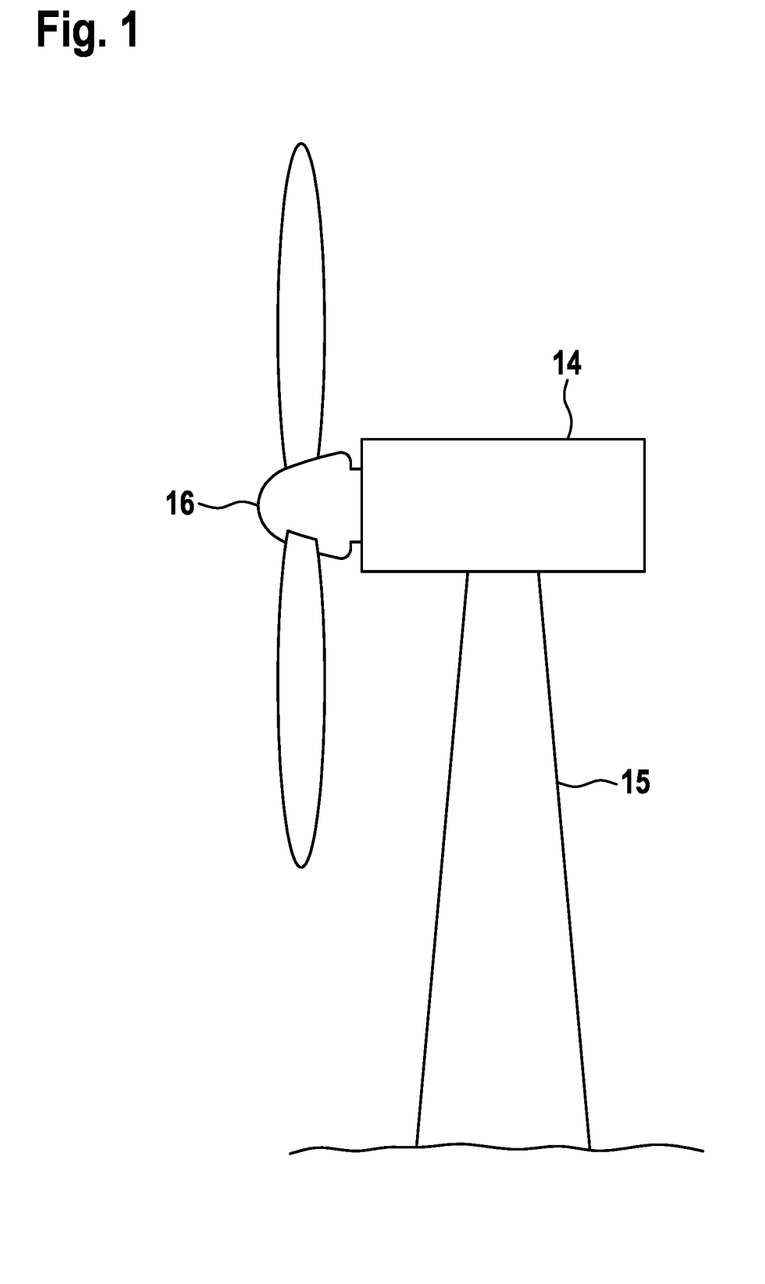
FIG. 1 shows a side view of a wind turbine.

In a wind turbine shown in FIG. 1, a nacelle 14 is arranged rotatably on a tower 15. The nacelle carries a rotor 16 which is set in rotation by the wind. The rotor 16 drives a generator via a rotor shaft in order to produce electrical energy. The electrical energy is conveyed via a converter and a transformer into a grid that is internal to the wind farm and is fed from there into an electrical transmission grid.

When such a wind turbine is erected, the tower 15 is first constructed by a plurality of tower segments 17 being arranged one on top of the other. The tower 15 is designed such that it stands stably without excessive vibration when the weight of the nacelle 14 bears on the upper end of the tower 15. In the intermediate state in which the tower stands without the upper end bearing a great weight, there is a risk that the tower 15 is caused to vibrate. According to the invention, a vibration damper 19 is arranged in the topmost tower segment 18 of the tower 15 and is designed to damp the vibration of the tower 15 such that the tower 15 is protected from excessive vibration even when the nacelle 14 is not present.

Figure 4:
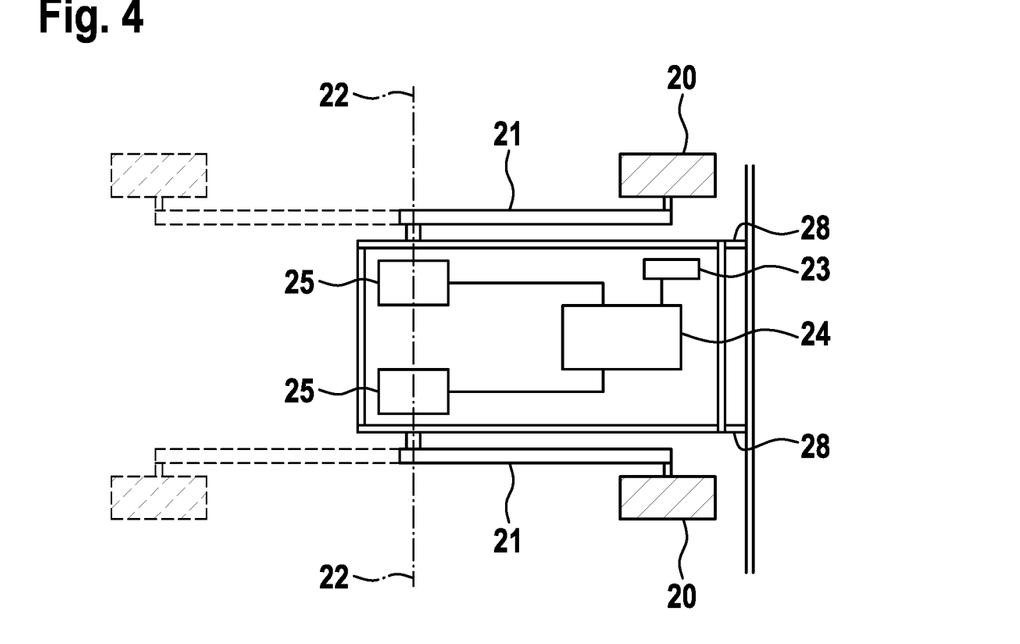
FIG. 4 shows a vibration damper according to the invention in the in-use state.
Figure 5:
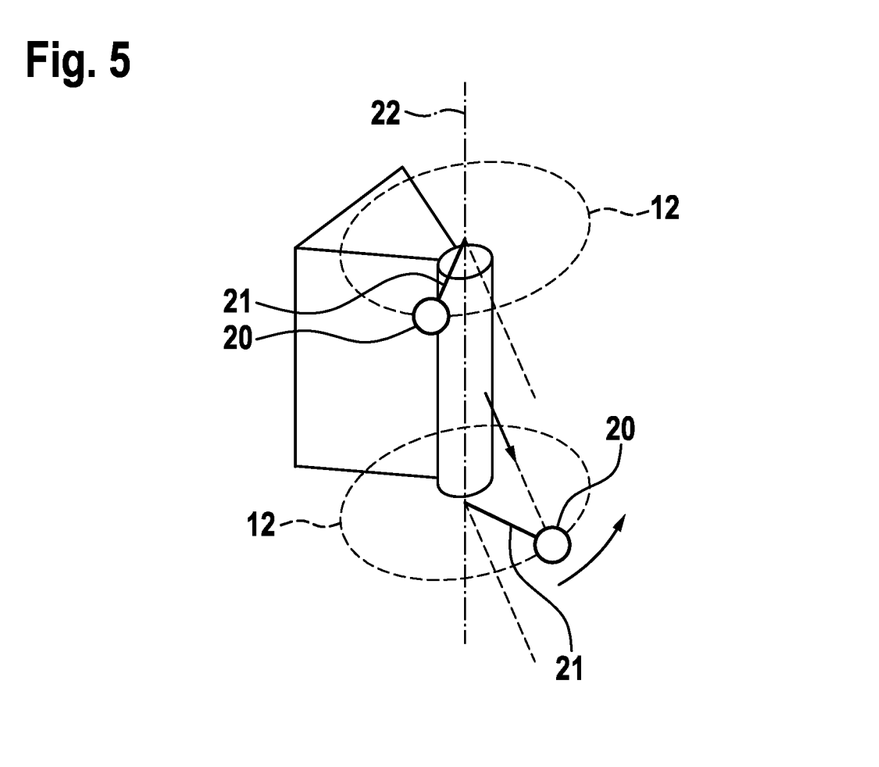
FIG. 5 shows a schematic representation of the functioning of the vibration damper from FIG. 4.

The fundamental principle of the vibration damper 19 is shown in FIG. 4. The vibration damper 19 is an active system and consists of two excentrically mounted revolving and counter-revolving damper masses 20 (unbalanced masses) which are each driven by a motor (or a motor and a gearbox) and are maintained at a constant distance from a common axis of rotation 22 via a guide arm 21. The planes in which the two damper masses 20 move lie parallel to each other. The forces caused by the movement of the damper masses 20 are used to damp the vortex-induced tower vibration. Given a constant rotational speed w of the damper masses 20, a harmonic damping force $F_c$ results with the amplitude $$F_c = 2 \cdot m_c \cdot \Gamma_c \cdot \omega^2.$$

$m_c$ here designates the mass of a damper mass 20 and $\Gamma_c$ the radial distance between the damper mass 20 and the axis of rotation 22.

According to FIG. 4, the tower vibration is measured by sensors 23 and the direction and frequency of the vibration are identified in a control unit 24. Based on this, the control unit 24 calculates control variables for the electromotors 25 by means of which the rotational movement of the damper masses 20 is driven. The motor speed $\omega$ is in particular part of the control variables of the electromotors. The system works automatically once it has been put into operation. The distance between the damper masses 20 and the axis of rotation 22 can lie, for example, between 0.5 m and 1 m, and the damper masses can, for example, have a mass between 50 kg and 150 kg.

Figure 2:
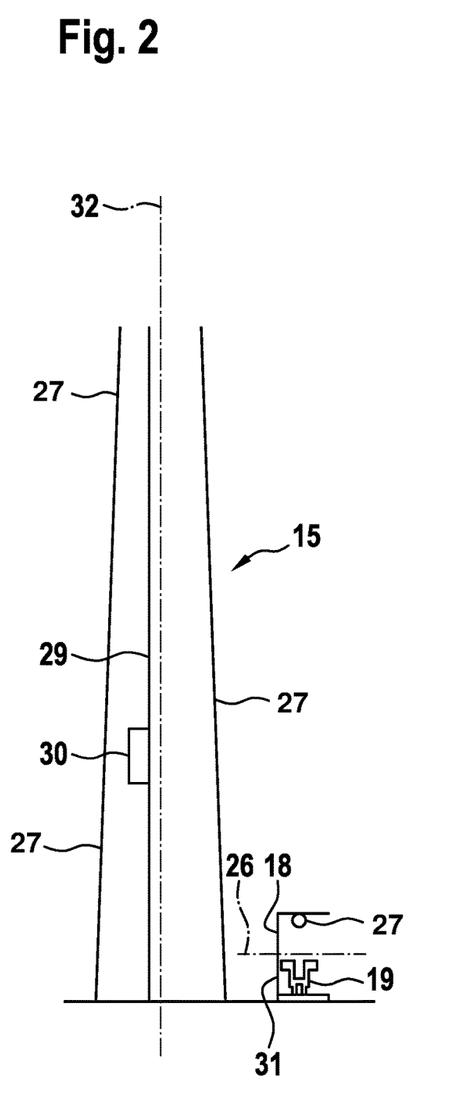
FIG. 2 shows a first intermediate state in the erection of the tower of the wind turbine from FIG. 1.
Figure 3:
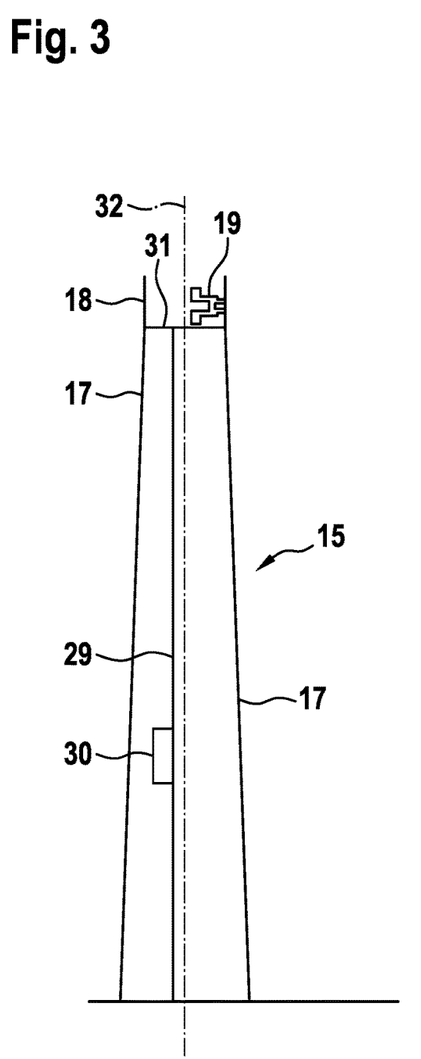
FIG. 3 shows a second intermediate state in the erection of the tower of the wind turbine from FIG. 1.

In the in-use state, the vibration damper 19 is, as shown in FIG. 3, connected to the tower wall and projects into the interior of the tower 15. The vibration damper 19 is assembled in the topmost tower segment 18 according to FIG. 2 whilst the topmost tower segment 18 is still lying on the ground. The topmost tower segment 18 is in a lying position in which the center axis 26 of the tower segment 18 is oriented essentially horizontally. The wall section to which the vibration damper 19 is connected points downward in the view in FIG. 2. A different angular position of the tower segment can also be expedient in practice.

The vibration damper 19 is moved into the interior of the tower segment 18 by means of a ladder-guided roller carriage. The vibration damper 19 is lifted and brought into an upright position by means of a hoist which is fastened to a retaining point 27 such that it can be connected to the assembly elements 28 formed in the tower wall.

After the vibration damper 19 is connected to the tower segment 19, the tower segment 18 is brought into an upright position by a large crane, lifted to the upper end of the tower 15, and placed on the already erected tower segments 17. When the tower segment 18 has been rigidly connected, the vibration damper 19 is connected to a power supply and hence brought into an active state. As soon as vibration occurs in the tower 15, the damper masses 20 are set in motion in order to damp the vibration.

The tower 15 comprises a service elevator 29 with an elevator car 30 which travels between the foot of the tower and a platform 31 at the upper end of the tower 15. The vibration damper 19 is arranged and dimensioned such that it is possible to exit safely onto the platform 31 even when the vibration damper 19 is in operation and the damper masses 20 are moving. In particular, the circle 12 described by the movement of the damper masses 20 does not intersect the center axis 32 of the tower 15. The vibration damper 19 can optionally be provided with a protective cover by means of which unintended contact with the damper masses 20 is prevented.

As soon as the head of the wind turbine is assembled with the nacelle 14 and the rotor 16, the vibration damper 19 is no longer required in order to maintain the tower 15 in a stable state without excessive vibration. The vibration damper 19 can be taken out of operation and disassembled.

Figure 9:
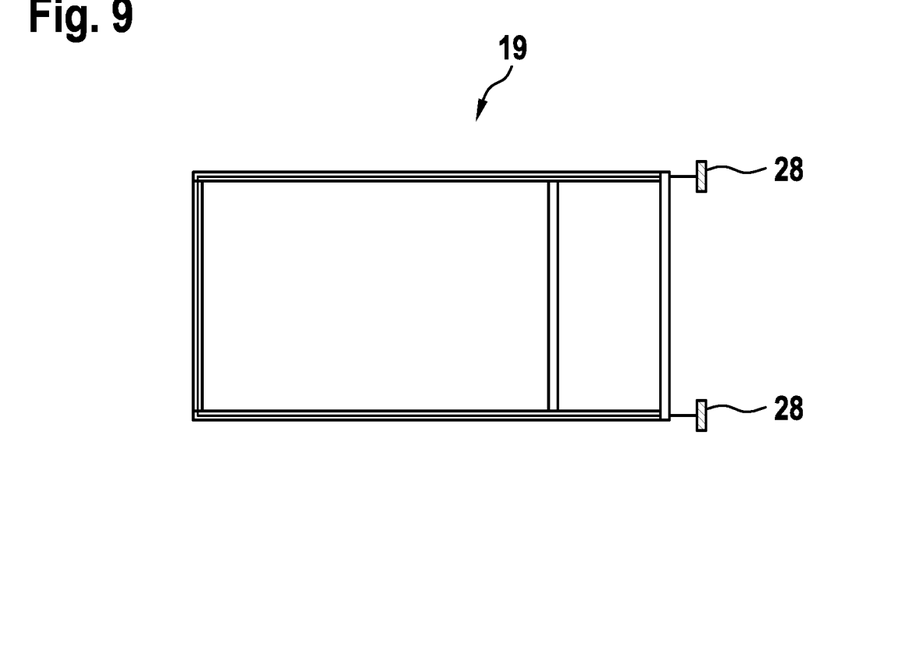
FIGS. 9-12 show multiple steps in the transition between the in-use state and the transport state of the vibration damper according to the invention.

The steps in disassembling the vibration damper 19 are explained with the aid of FIGS. 9 to 12. FIG. 9 shows a state in which the vibration damper 19 is suspended from the assembly elements 28 of the tower segment 18 and in which the damper masses 20 and the guide arms 21 are disassembled. The aim is to place the vibration damper 19 on the platform 31 of the topmost tower segment 18 without the assistance of an external crane.

Figure 10:
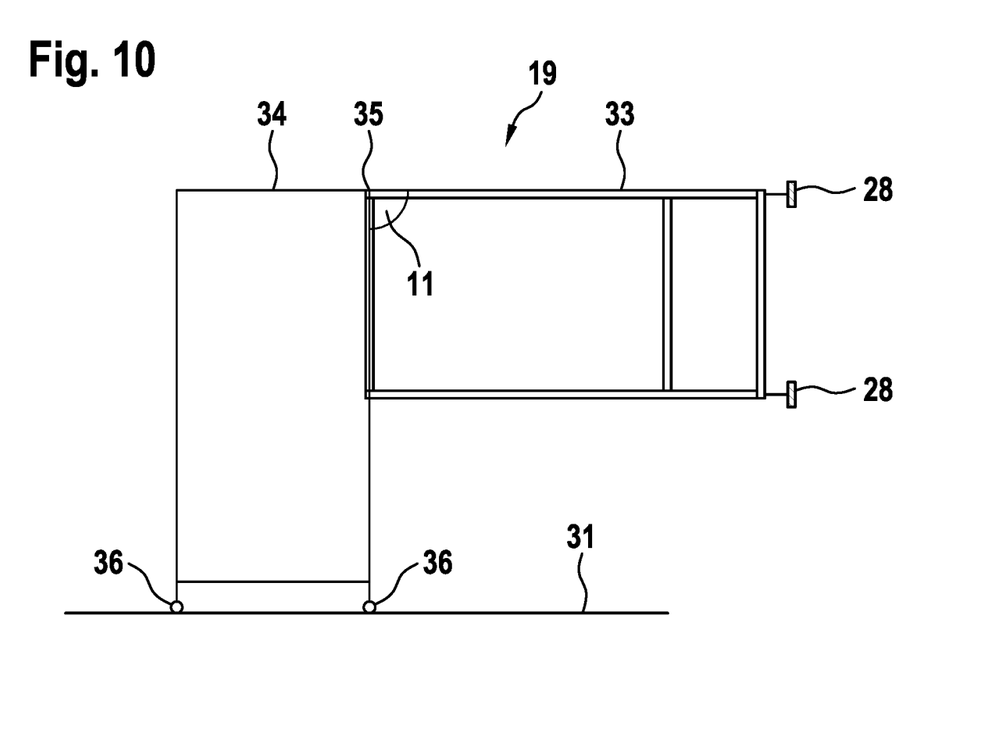
Figure 11:
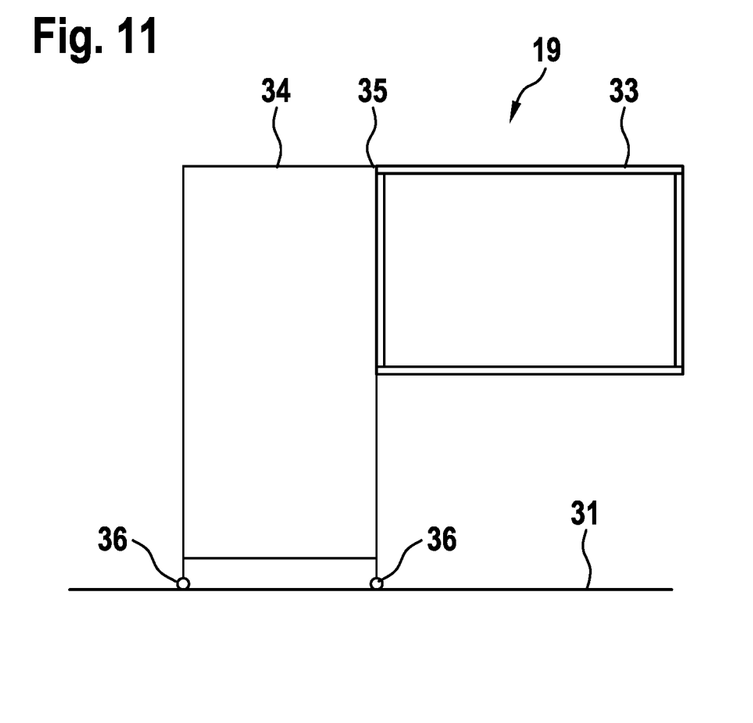

As shown in FIG. 10, the vibration damper 19 comprises a housing part 34 and a frame part 33 which are mounted so that they can pivot about a pivot axis 35 relative to each other over an angle of tilt 11. The housing part 34 forms a housing inside which the technical components of the vibration damper 19, such as for example the motors 25 and the control unit 24, are accommodated. In FIG. 9, the pivot part 33 surrounds the housing part 34 on two sides and encloses the housing part 34 between them.

By means of a pivoting movement, the housing part 34 can be pivoted into an upright position according to FIG. 10, whilst the frame part 33 is furthermore connected to the tower segment 18. The housing part 34 is provided at its lower end with rollers 36 which stand on the platform 31 when the housing part 34 has been brought into an upright position.

Figure 12:
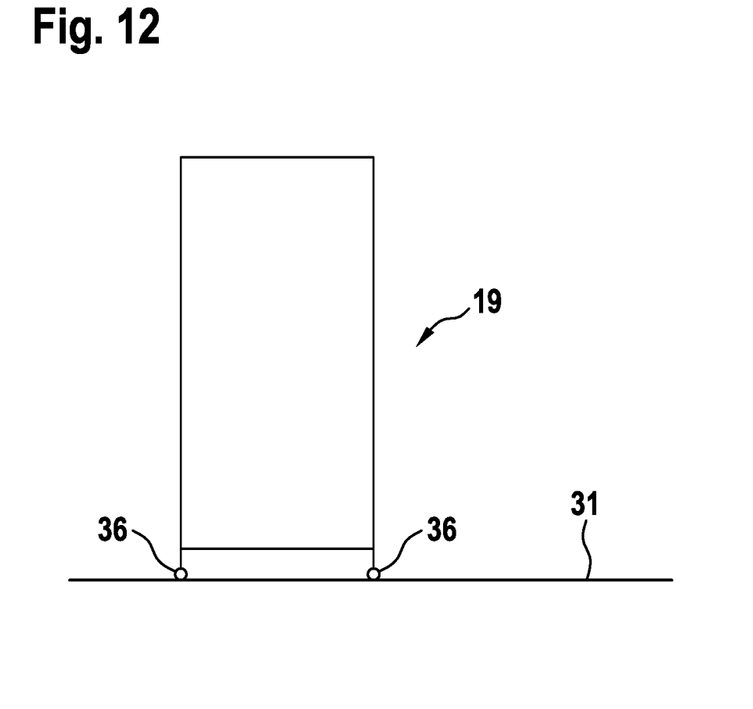

When the housing part 34 stands stably on the platform 31, the connection between the frame part 33 and the assembly elements 28 of the tower segment 18 can be disconnected. A part of the housing part 33 adjacent to the assembly elements 28 is folded in such that the horizontal extent of the frame part 33 is less than the height of the housing part 34 (see FIG. 11). By means of a pivoting maneuver, the frame part 33 is tilted downward such that the housing part 34 is accommodated again inside the frame part 33. FIG. 12 shows the vibration damper 19 in the transport state. The vibration damper 19 can be pushed on the platform 31 into the elevator car 30 of the service elevator 29 and moved to the foot of the tower 15. The vibration damper 19 is then ready to be used when erecting another wind turbine.

Figure 6:
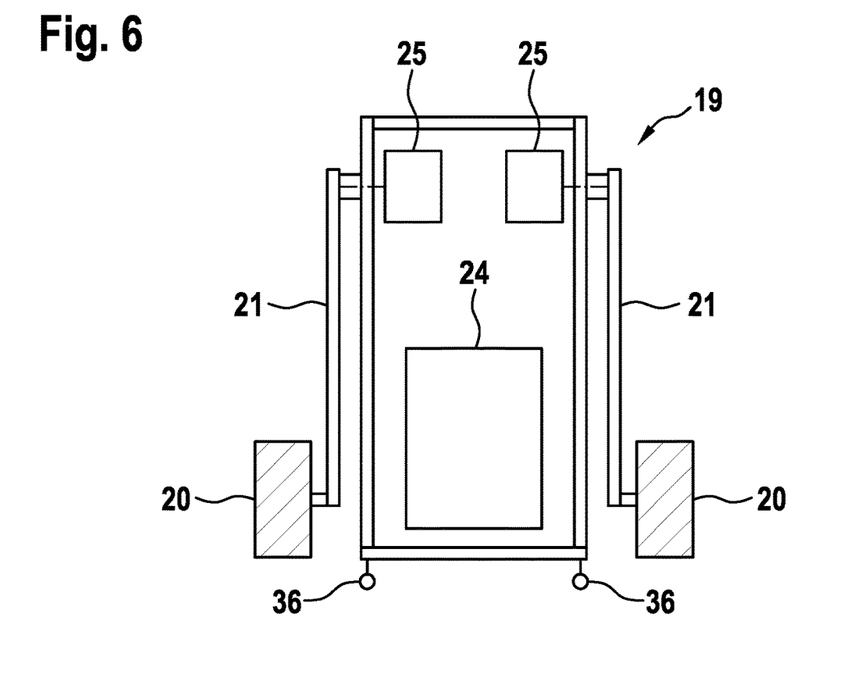
FIG. 6 shows the vibration damper from FIG. 4 in the transport state.
Figure 7:
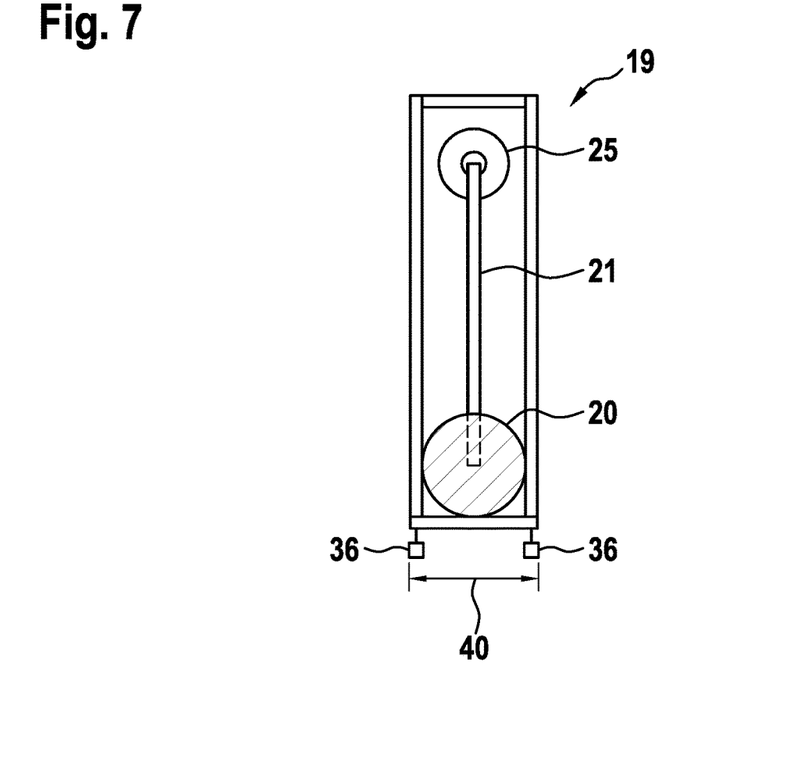
FIG. 7 shows the vibration damper according to FIG. 6 from a different perspective.
Figure 8:
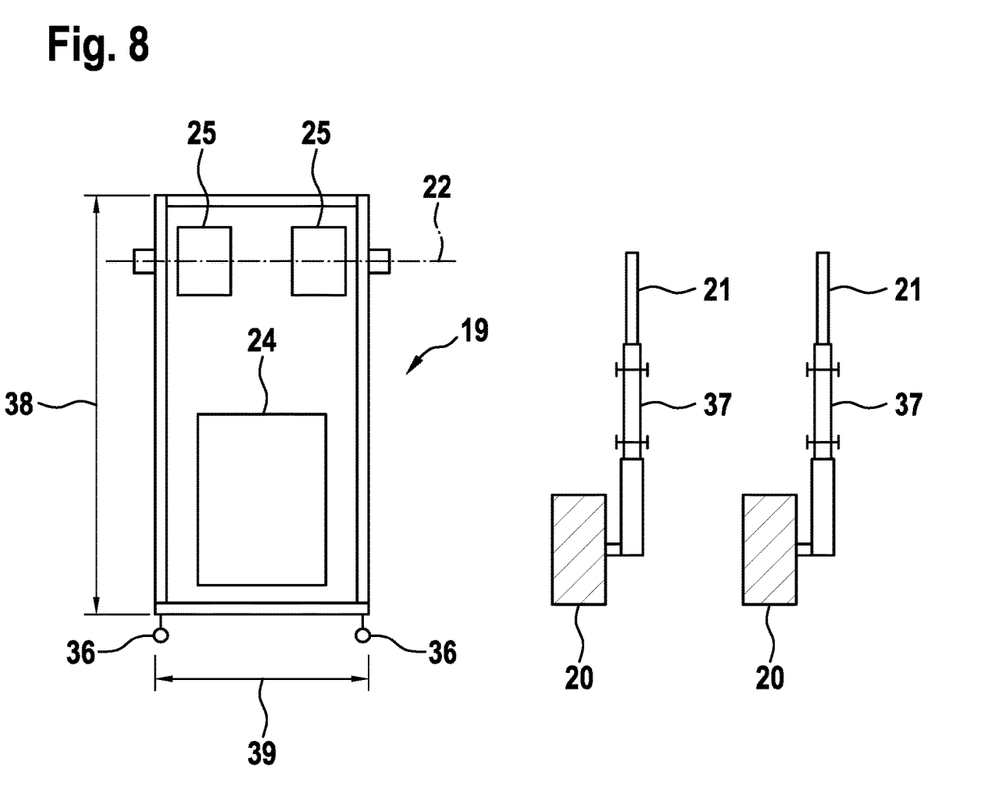
FIG. 8 shows a different embodiment of a vibration damper according to the invention in the transport state.

An embodiment is shown in FIGS. 6 and 7 in which the damper masses 20 and the guide arms 21 are detached from the frame of the vibration damper 19 only after the tilting maneuver. In the alternative embodiment according to FIG. 8, the guide arms 21 are equipped with a telescopic mechanism 37. The distance between the damper masses 20 and the axis of rotation 22 of the vibration damper 19 can be adjusted appropriately via the telescopic mechanism 37 depending on the use case.

In the exemplary embodiment shown, the vibration damper 19 is configured such that in the transport state the height 38 is no greater than 180 cm, the width 39 is no greater than 80 cm, and the depth 40 is no greater than 45 cm. With these dimensions, the vibration damper 19 is suitable for transport in the elevator car 30 of the service elevator 29.

As an alternative to transport in the service elevator 29, it is also possible to use an onboard crane arranged in the nacelle 14 in order to lower the vibration damper 19 down inside the tower 15. To do this, the onboard crane is positioned above the vibration damper 19, the vibration damper 19 is lifted slightly, a hatch in the platform 31 is opened, and the vibration damper 19 is lowered.

According to a further alternative, the vibration damper 19 can be lifted into the interior of the nacelle 14 by the onboard crane and lowered through an opening in the floor of the nacelle 14, to the ground outside the tower 15.

The invention claimed is:

1. A dis-assembly method for a vibration damper of a tower of a wind turbine comprising:
   moving the vibration damper from an in-use state to a transport state; and
   subsequently removing the vibration damper from the tower wherein,
      the vibration damper comprises a damper mass mounted to a frame,
      the frame is connected to a structural component of the tower and in
   the in-use state the vibration damper projects into an interior of the tower,
      in the in-use state, the damper mass can be set in motion relative to the frame by a drive such that a distance between the damper mass and a center axis of the tower changes, and
   the step of moving the vibration damper includes tilting the vibration damper relative to the in-use state.

2. The dis-assembly method of claim 1, wherein a distance between the damper mass and an axis of rotation can be adjusted.

3. The dis-assembly method of claim 1, wherein a mass of the damper mass can be adjusted.

4. The dis-assembly method of claim 1, wherein the vibration damper comprises a housing part and a frame part which can pivot relative to the housing part and the step of moving the vibration damper comprises:
   pivoting the housing part relative to the frame part while the frame part is still connected to the structural component of the tower;
   supporting the housing part such that a weight of the vibration damper is at least partially transmitted via the housing part; and
   detaching the frame part from the structural component of the tower.

5. The dis-assembly method of claim 1, wherein the vibration damper is provided with rollers.

6. The dis-assembly method of claim 1, wherein the vibration damper is moved in the transport state by a service elevator of the tower to a foot of the tower.

7. The dis-assembly method of claim 1, wherein the vibration damper is connected to a tower segment while the tower segment is in a lying state.

8. The dis-assembly method of claim 7, wherein the tower segment comprises an assembly element for the vibration damper and a retaining point, opposite the assembly element, for a cable/chain hoist.

9. A dis-assembly method for a vibration damper of a tower of a wind turbine comprising:
   moving the vibration damper from an in-use state to a transport state; and subsequently removing the vibration damper from the tower wherein, the vibration damper comprises a first damper mass and a second damper mass mounted to a frame, the frame is connected to a structural component of the tower, in the in-use state, the first damper mass and the second damper mass can be set in motion along opposite circular paths relative to the frame by a drive such that a distance between the first and second damper masses and a center axis of the tower change, and the step of moving the vibration damper includes tilting the vibration damper relative to the in-use state.

10. The dis-assembly method of claim 9, wherein a distance between the first and second damper masses and an axis of rotation can be adjusted.

11. The dis-assembly method of claim 9, wherein a mass of the first and second damper masses can be adjusted.

12. The dis-assembly method of claim 9, wherein the vibration damper comprises a housing part and a frame part which can pivot relative to the housing part.

13. The dis-assembly method of claim 9, wherein the vibration damper is provided with rollers.

14. The dis-assembly method of claim 9, wherein the vibration damper is moved in the transport state by a service elevator of the tower to a foot of the tower.

15. The dis-assembly method of claim 9, wherein the vibration damper is connected to a tower segment while the tower segment is in a lying state.

16. The dis-assembly method of claim 15, wherein the tower segment comprises an assembly element for the vibration damper and a retaining point, opposite the assembly element, for a cable/chain hoist.

17. A dis-assembly method for a vibration damper of a tower of a wind turbine comprising:

moving the vibration damper from an in-use state to a transport state; and subsequently removing the vibration damper from the tower wherein, the vibration damper comprises a damper mass mounted to a frame, the frame is connected to a structural component of the tower, in the in-use state, the damper mass can be set in motion relative to the frame by a drive such that a distance between the damper mass and a center axis of the tower changes, and the step of moving the vibration damper includes tilting the vibration damper relative to the in-use state over an angle of greater than 45°.

18. A dis-assembly method for a vibration damper of a tower of a wind turbine comprising:

moving the vibration damper from an in-use state to a transport state; and subsequently removing the vibration damper from the tower wherein, the vibration damper comprises a damper mass mounted to a frame, the frame is connected to a structural component of the tower, in the in-use state, the damper mass can be set in motion relative to the frame by a drive such that a distance between the damper mass and a center axis of the tower changes, and the step of moving the vibration damper includes tilting the vibration damper relative to the in-use state and a tilt axis to which the vibration damper is tilted between the in-use state and the transport state encloses an angle of at least 45° with an axis of rotation of the damper mass.

* * * * *